United States Patent [19]

Diaz

[11] Patent Number: 4,837,670
[45] Date of Patent: Jun. 6, 1989

[54] BIAS SOURCE FOR A SWITCHMODE CONVERTER

[75] Inventor: Bonifacio Diaz, El Paso, Tex.

[73] Assignee: Zenith Electronics Corporation, Glenview, Ill.

[21] Appl. No.: 247,030

[22] Filed: Sep. 20, 1988

[51] Int. Cl.[4] .......................................... H02M 3/335
[52] U.S. Cl. ........................................ 363/21; 363/56; 363/97
[58] Field of Search ....................... 363/20, 21, 45, 56, 363/97, 98

[56] References Cited

U.S. PATENT DOCUMENTS

| | | | |
|---|---|---|---|
| 4,063,306 | 12/1977 | Perkins et al. | 363/56 |
| 4,172,277 | 10/1979 | Pinson | 363/21 |
| 4,228,493 | 10/1980 | de Sartre et al. | 363/21 |
| 4,236,187 | 11/1980 | Mochizuki et al. | 363/21 |
| 4,276,588 | 6/1981 | McLyman et al. | 363/56 |
| 4,438,486 | 3/1984 | Ferraro | 363/21 |
| 4,559,592 | 12/1985 | Muller | 363/21 |
| 4,561,046 | 12/1985 | Kuster | 363/21 |
| 4,607,322 | 8/1986 | Henderson | 363/56 |
| 4,675,796 | 6/1987 | Gautherin et al. | 363/20 |
| 4,694,386 | 9/1987 | de Sartre | 363/49 |
| 4,717,994 | 1/1988 | Diaz et al. | 363/21 |
| 4,734,636 | 3/1988 | Stevens | 323/235 |

*Primary Examiner*—Peter S. Wong

[57] ABSTRACT

A regulator/converter is disclosed having a transformer, a switch in series with the primary of the transformer, a control for opening and closing the switch to supply current through the primary winding of the transformer in response to the output of the transformer, and means for storing energy when the induced voltage across the switch is of one plurality and for transferring such energy to power or operate the controller when the induced voltage is of the opposite plurality.

20 Claims, 1 Drawing Sheet

BIAS SOURCE FOR A SWITCHMODE CONVERTER

TECHNICAL FIELD

The present invention relates to the subject of power supplies, in general, ad to switchmode power converters, in particular.

BACKGROUND OF THE INVENTION

Isolation is often provided in a power converter which runs off an AC line. The associated control logic or circuitry may receive its power from the primary side (i.e., AC line) or the secondary side or output side (See FIGS. 1A and 1B). If on the secondary side, a bias transformer provides initial power. Once the power converter starts, it then provides additional power for the control circuitry.

With increasing demand for lower cost and higher power density, the control logic or circuitry of a power converter is more often being placed on the primary AC line, where it can be powered initially without an isolated or bias transformer. In such a situation, an extra winding off (see FIG. 1B) the power converter transformer provides additional power; U.S. Pat. No. 4,694,386 to de Sartre is representative of this arrangement. The output voltage (or current) is then sensed by additional circuitry located on the secondary side and a signal is sent back through a small pulse transformer to the primary side control circuitry (See U.S. Pat. No. 4,717,994 to Diaz et al., and assigned to the assignee of the present invention).

Those skilled in the art will appreciate the fact that, when transformers are used, the expense of the associated circuitry increases. Even when a transformer power supply uses part of an existing transformer (i.e., additional secondary windings) the core mass increases and the cost of manufacture increases, although not as much as in the former case.

In switching or switch-mode power supplies, some measures are required to avoid impressing excessive induced voltages across the switching device (usually a semi-conductor or solid-state switch) when it transfers from the closed or conducting state to an open or off state. If the switched current is suddenly terminated, the voltage induced in the primary side of the transformer by the sudden collapse of current is capable of reaching enormous values (e.g., 200 volt spike). Unless something is done, the induced voltage can well exceed the break down voltage of the switching semi-conductor.

One solution has been to shunt the primary winding of the transformer or the switching device (or both) with some means of absorbing the leakage inductance energy in the transformer (See U.S. Pat. No. 4,172,277 to Pinson). Typically, such a shunt includes a capacitor and a diode for establishing a current loop whereby the transformer primary current is used to charge a capacitor when the switch is open. When the switch again closes, the energy stored in the capacitor is dissipated through a discharge path.

Many power converters which use solid-state switches (i.e., bi-polars, FET's, SCR's etc.) utilize "snubbers" to minimize power stress due to inductive load. Typically, the stored energy of the snubber is converted to heat energy or dissipated through a resistor. In some converters, the energy of the snubber is diverted to the output of the converter so as to perform non-dissipative snubbing (See U.S. Pat. No. 4,675,796 to Gautherin et al.; U.S. Pat. No, 4,561,046 to Kuster; U.S. Pat. No. 4,734, 636 to Stevens; U.S. Pat. No. 4,063,306 to Perkins et al.; and U.S. Pat. No. 4,607,322 to Henderson).

Therefore, it is one of the objects of the present invention to provide a smaller, more efficient, and lower cost power converter. In particular, it is one of the objects of this invention to use existing components, insofar as possible, so as to provide a dual function and thereby obtain two effects from the same circuitry or components.

SUMMARY OF THE INVENTION

In accordance with the present invention, a switchmode converter is disclosed of the type having an inductive winding in series with a switch, control or logic means for operating the switch, and a dual purpose circuit for supplying a bias voltage to the control means and performing a snubbing function. The bias and snubbing circuit comprises a resistor in series with a capacitor, with the combined with the series circuit of the resistor and capacitor being in parallel with the switch, and a diode which bridges the node between the resistor and the capacitor and the bias input of the control means.

In one particular embodiment of the invention, the converter comprises a bridge rectifier, a transformer having one end of its primary winding connected to the output of the rectifier, a solid-state switch connected between the other end of the primary winding and ground, an input resistor and an input capacitor in series with each other and across the output of the rectifier, a solid-state pulse width modulating controller for selectively operating the solid-state switch to supply DC current through the primary winding of the transformer as a function of the output of the transformer, and snubbing means for reducing the peak power dissipation seen by the switch when the switch is turned off by the controller and for powering said controller. The snubbing means includes a diode which has one end joined to the node between the input capacitor and input resistor and the bias input of the controller. Thus, the solid-state switch is protected from inductive load power stress and bias power is provided to the controller without having to use a separate transformer or additional secondary winding. Thus, the cost of the converter is reduced, and efficiency is improved without the need for additional components or circuits.

Other features and advantages of the invention will be clear from the following detailed description made with reference to the accompanying drawings.

DETAILED DESCRIPTION OF THE PREFERRED EMBODIMENTS

Figure 1A:
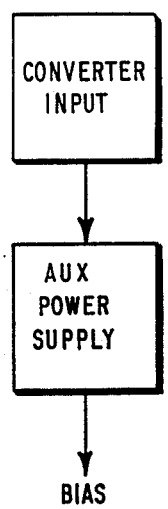
FIGS. 1A and 1B are block diagrams of prior art power supplies for a solid-state controller.
Figure 1B:
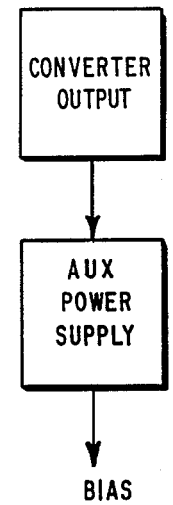

While this invention is susceptible of embodiment in many different forms, there is shown in the drawings, and will herein be described in detail, several embodiments of the invention. It should be understood, however, that the present disclosure is to be considered as an exemplification of the principles of the invention and is not intended to limit the invention to the specific embodiments illustrated.

Throughout the discussion which follows, it should be understood that the terms "diode" and "switch" are used in the functional sense and not exclusively with regard to ordinary solid-state components or mechanical equivalents. The same is true with regard to capacitors, resistors, inductors and the like. Similarly, the term "converter" is used in the broadest sense of the word, so as to include inverters and devices which perform AC to DC, DC to AC, DC to DC, and AC to AC conversion.

Figure 2:
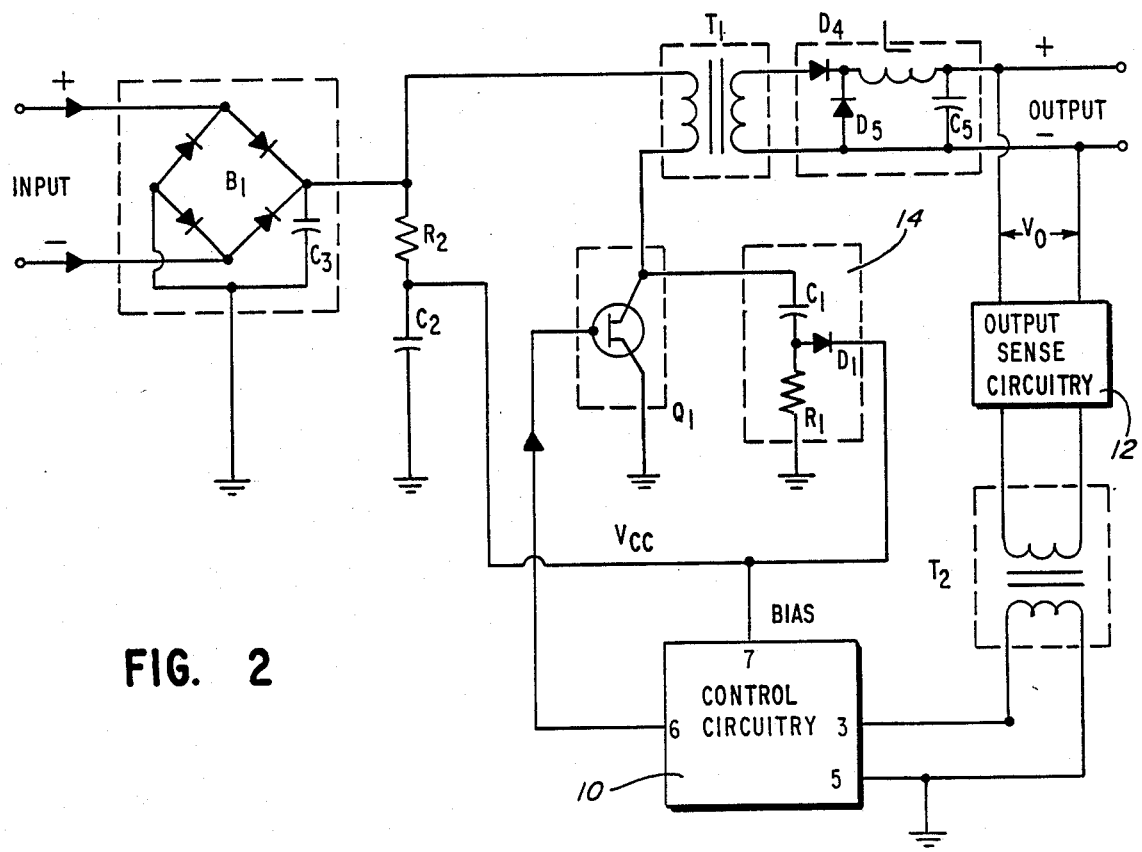
FIG. 2 is a circuit diagram of a switchmode converter incorporating the present invention.

Turning to FIG. 2, there is illustrated one example of a switchmode power supply or converter or inverter which incorporates the teachings of the present invention. In particular, AC current, which may be filtered, is supplied to a rectifier bridge B1 whose output is connected, on one hand, to a primary electrical ground, and on the other hand, to end of a primary winding of a power transformer T1.

A filtering capacitor C3 is placed in parallel across the output of the rectifier bridge B1. The other end of the primary winding is connected to a solid-state switch Q, such as a field effect transistor (FET) to provide a return path to ground for the primary of the transformer.

The transformer T1 may have several secondary winding which are preferably isolated from the primary ground and the AC input. In this particular embodiment, one secondary winding is illustrated which uses diodes D4 and D5 for supplying rectified current to an output inductor L through which rectified, filtered output current flows to output terminals. The output voltage is developed across capacitor C5.

Switch Q1 is controlled by a signal applied to its gate electrode. This signal is provided by a solid-state controller or logic circuit 10, such as the type represented by a current mode PWM controller (i.e., UNITRODE UC-3842). Such controllers receive, as inputs, voltages which are proportional to controlling perimeters, such as line voltage and output voltage Vo. In this particular embodiment, the output voltage Vo passes through output sense circuitry 12 and an isolation transformer T2. T2 isolates the output sense circuitry 12 from the control circuitry 10. In response to the controller 10, the switch Q1 operates at a high rate. The controller 10 receives its power from a source of bias voltage Vcc. Before the switch Q1 is placed in operation to produce an output voltage Vo, the bias voltage to operate the control circuitry 10 is supplied from a resistor R2 which is in series with a large capacitor C2. Resistor R2 and Capacitor C2 are in series with each other and are across the output of the bridge B1. Resistor R2 is relatively large and therefore slowly charges C2 when power is supplied to the input of bridge B1. It does this without diverting current from the primary of the transformer T1.

Disposed across switch Q1 is a snubber circuit 14. In the particular embodiment illustrated in FIG. 2, the snubber circuit comprises a capacitor C1 in series with a resistor R1. The series combination of capacitor C1 and resistor R1 is in parallel with the terminals of switch Q1. The common node between capacitor C1 and resistor R1 is connected to the node between input resistor R2 and input capacitor C2 by a diode D1. As such, capacitor C1, resistor R1, and diode D1 form a "snubber" or snubbing means. The snubber 14 minimizes power stress due to the inductive load.

When switch Q1 stops conducting, there is a rapid decline in the switched current and a consequent buildup in the induced voltage which is primarily due to the leakage inductance seen by the primary side of the magnetic circuit. The snubber circuit 14 provides a path for current in the primary side of the transformer T1 to charge capacitor C1 when Q1 is "off". When switch Q1 is "on", R1 provides a discharge path for the capacitor C1, thereby preparing it to accept the turn off charge. The power dissipated in the snubber resistor R1 is the energy in the capacitor C1 multiplied by the switching frequency. When switch Q1 turns off, the energy in the capacitor, instead of being dissipated in resistor R1 is transferred by diode D1 to capacitor C2, thereby providing a source of voltage Vcc to the bias input port Vcc of the controller 10. The power transferred is proportional to the frequency and is given by:

$$\text{power} = \tfrac{1}{2} CV^2 f$$

where "C" is the capacitance of the snubber capacitor C1, "V" is the peak capacitor voltage and "f" is the switching frequency. Typically, C2=100 C1. Vcc is on the order of 12 volts. Capacitor C1 is chosen in accordance with the power to be diverted from the switch Q1. Thus, the value "C" of this capacitor C1 will be generally larger for slower switching devices or more stressful conditions. The RC time constant is then made small, compared to the "on time" of the transistor, thereby guaranteeing complete discharge of the capacitor before turn-off again occurs.

From the foregoing, it should be appreciated that the power supply illustrated in FIG. 2 is smaller and less expensive. In particular, relative to the situation where an additional winding (i.e., an additional secondary winding), was required on transformer T1 and additional supporting components (i.e., comparable to diodes D4 and D5, inductor L, and capacitor C5) were needed to filter the output of the additional winding, the circuit of FIG. 2 uses less components and is less expensive. In addition, it is more energy efficient. This is because transformer T1 can be made smaller since one less winding and less power handling is needed. The cost savings can be on the order of 30 percent.

From the foregoing description, it will be observed that several variations and modifications may be effected without departing from the true spirit and scope of the novel concept of the invention. For example, the voltage derived from a snubber may be used for other purposes, not just to provide a bias voltage to the solid-state controller. Thus, it should be understood that no limitation with respect to the specific apparatus illustrated herein is intended or should be inferred. It is, of course, intended to cover by the appended claims all such modifications as fall within the scope of the claims.

I claim:

1. A regulator/converter, comprising:
   (a) a transformer;
   (b) a switch in series with the primary of said transformer, said switch and transformer being adapted to be connected across a source of DC voltage;
   (c) control means for opening and closing said switch to supply current through the primary winding of said transformer in response to the flow of current through the output of the transformer;
   (d) snubber means for said switch; and (e) bias means, using the flow of current through said snubber means, for supplying voltage to said control means.

2. The regulator/converter of claim 1, wherein said switch comprises a field effect transistor (FET); and wherein said snubber means comprises a series circuit of a resistor in series with a capacitor, said series circuit being disposed across said FET.

3. The regulator/converter of claim 1, wherein said snubber means is connected across said switch, and wherein said snubber means comprises, a first capacitor, a first resistor which is connected in series with a first capacitor, and a diode having one end joined the node between said first capacitor and said first resistor.

4. The regulator/converter of claim 3, further including a second circuit of a second resistor in series with a second capacitor, said second circuit being in parallel with the series combination of said primary winding of said transformer and said switch; and wherein the other end of said diode is joined to the node between said second resistor and said second capacitor.

5. The regulator converter of claim 4, wherein said control means is an integrated circuit having a current sensing input terminal, a ground terminal, an output terminal to drive said switch, and a voltage input terminal which is connected to said node between said second resistor and said second capacitor.

6. A regulator/converter adapted to be connected to a source of DC power, comprising:
(a) a first circuit of a primary winding of a transformer in series with a solid-state switch and its snubber; and
(b) solid state control circuitry, biased by said snubber, for operating said switch to selectively supply DC current through the primary winding of the transformer in response to the flow of current from the secondary winding of said transformer.

7. The regulator/converter of claim 6, wherein said switch comprises a field effect transistor (FET); wherein said snubber comprises a resistor and capacitor means in series with each other and in parallel with said FET; and wherein the bias input of said solid state control circuitry is joined to the node between said resistor and capacitor means by diode means.

8. The regulator/converter of claim 6, wherein said solid-state control circuitry comprises a current mode pulse width modulated (PWM) controller; and wherein said solid-state switch is a field effect transistor (FET).

9. The regulator/converter of claim 8, wherein said controller is one of the UC-1842/3/4/5 family of integrated circuits.

10. A regulator/converter, comprising:
(a) a bridge rectifier;
(b) a transformer having one end of its primary winding connected to the output of said rectifier;
(c) a solid-state switch in series with the other end of said primary winding;
(d) a resistor and capacitor disposed across the output of said rectifier;
(e) a solid-state pulse width modulated controller for selectively operating said switch to supply DC current through said primary winding in response to the output of said transformer; and
(f) snubbing means for reducing the peak power dissipation seen by said solid-state switch when said switch is turned off by said controller and for powering said controller.

11. The regulator/converter of claim 10, wherein said snubbing means comprises a resistor which is in series with a capacitor which is joined to said other end of said primary winding, and diode means for joining the node between said resistor and capacitor to the bias input of said controller.

12. In a regulator/converter having an inductive winding in series with a switch which is selectively operated to supply current to the winding, a circuit for providing a bias voltage, comprising:
(a) resistor means;
(b) capacitor means joined to said resistor means at a common node, the series circuit of said resistor means and said capacitor means being in parallel with the switch;
(c) a capacitor for providing a bias voltage therefrom; and
(d) diode means, connected to said node, for charging said capacitor, such that when the switch closes said capacitor means charges and when the switch opens inductive energy is passed through said diode means to said capacitor.

13. The circuit of claim 12, wherein said regulator/converter includes a control means for operating said switch, said control means having a bias port to which said bias voltage is applied.

14. The circuit of claim 12, wherein said capacitor has a capacitance much greater than said capacitor means.

15. The circuit of claim 12, wherein said switch is a solid-state switch.

16. The circuit of claim 12, wherein said switch is a Field Effect Transistor.

17. A regulator/converter, comprising:
(a) a transformer;
(b) a switch in series with the primary of said transformer, said switch and transformer being adapted to be connected across a source of DC voltage;
(c) control means for opening and closing said switch to supply current through the primary winding of said transformer; and
(d) energy transfer means, connected to said primary winding, for storing energy when the induced voltage across said switch is of one polarity and for transferring such energy to power said control means when said induced voltage is of the opposite polarity.

18. The regulator/converter of claim 17, wherein said energy transfer means comprises a resistor in series with a capacitor and one directional current flow means for bridging the node between said resistor and capacitor to the bias input of said control means.

19. The regulator/converter of claim 17, further including a relatively large resistor in series with a relatively large capacitor, the series combination of said relatively large capacitor and relatively large resistor being in parallel with the series combination of said switch and said primary of said transformer, the node between said relatively large capacitor and said relatively large resistor being joined to the bias input of said control means.

20. In a switch-mode power supply wherein a solid-state switch is selectively operated to control the flow of current through an inductive winding, a circuit comprising: a series network of a capacitor in series with a resistor, said series network being in parallel with the switch; and diode means having one end connected to the node between said capacitor and resistor and having an opposite end joined to a parallel network of a load and capacitor means to supply energy thereto.

* * * * *